J. GRUNDSTEIN.
MACHINE FOR THE AUTOMATIC MANUFACTURE OF WHEELS WITH ANGULAR OR DOUBLE HELICAL TEETH.
APPLICATION FILED JAN. 14, 1913.
1,185,657.
Patented June 6, 1916.
11 SHEETS—SHEET 1.
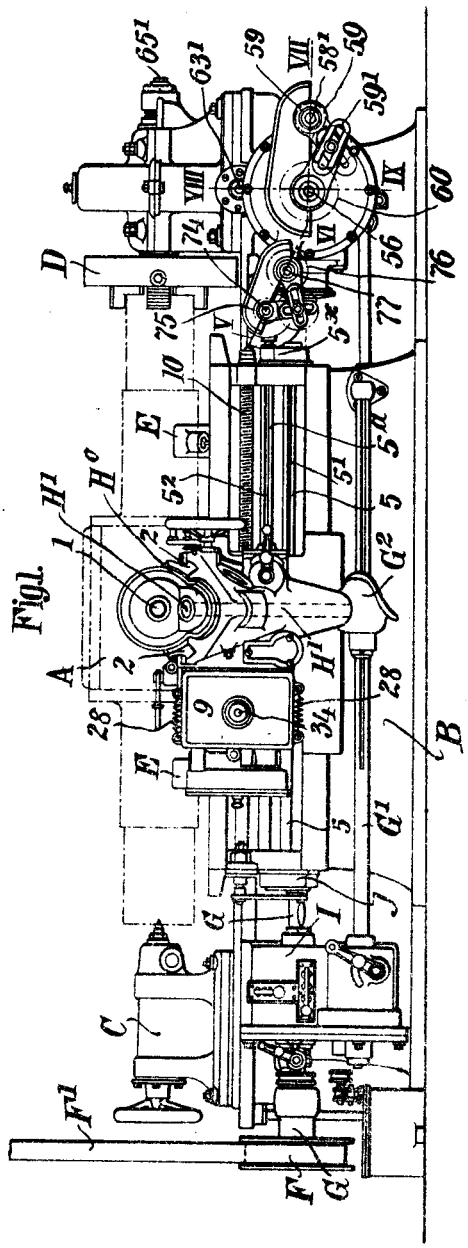

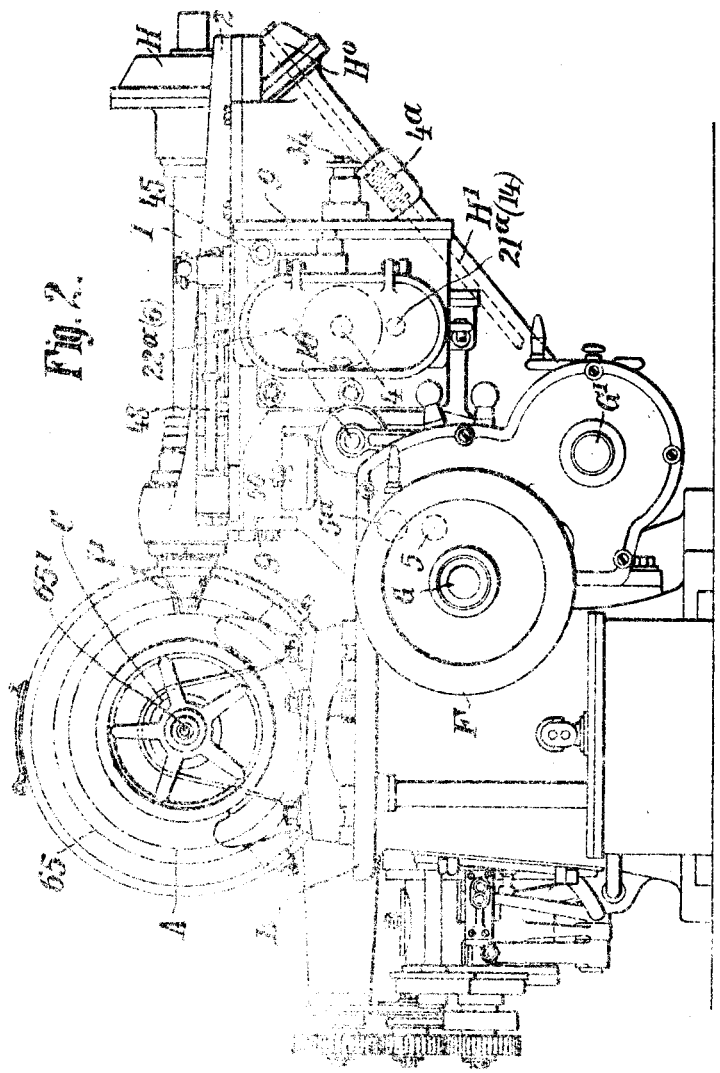

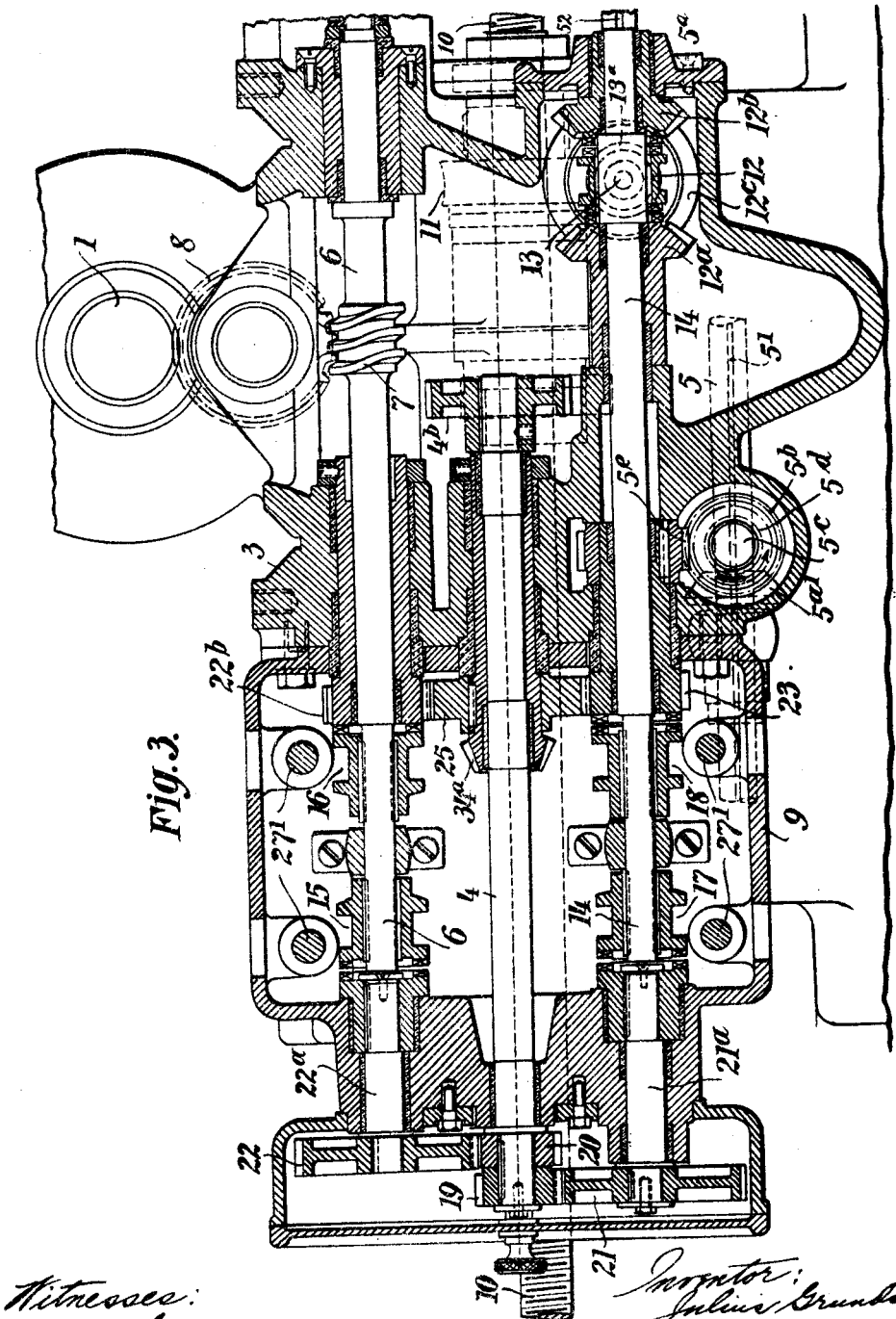

J. GRUNDSTEIN.
MACHINE FOR THE AUTOMATIC MANUFACTURE OF WHEELS WITH ANGULAR OR DOUBLE HELICAL TEETH.
APPLICATION FILED JAN. 5, 1915.
1,185,657.
Patented June 6, 1916.
11 SHEETS—SHEET 4.
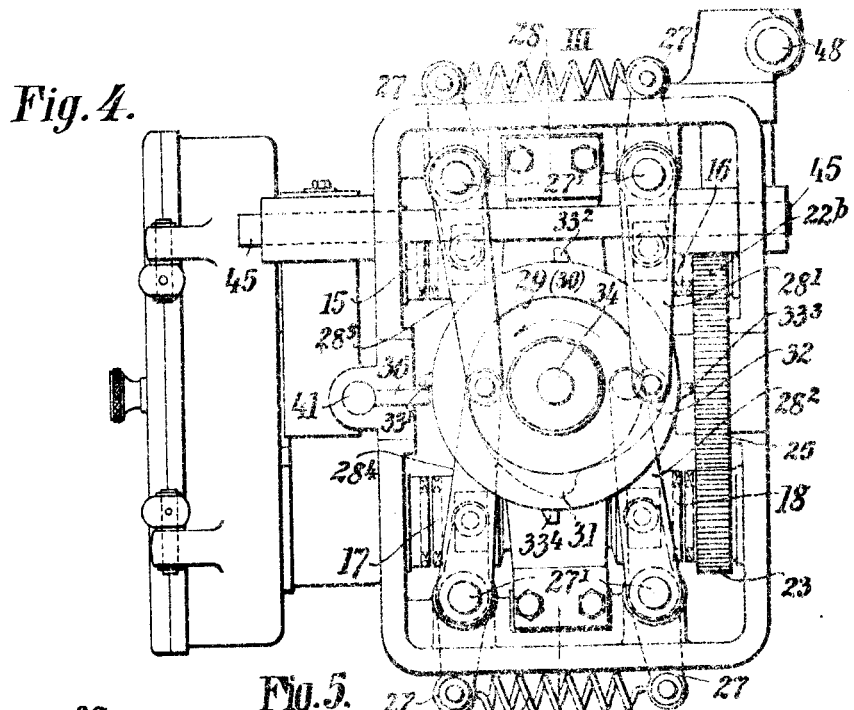
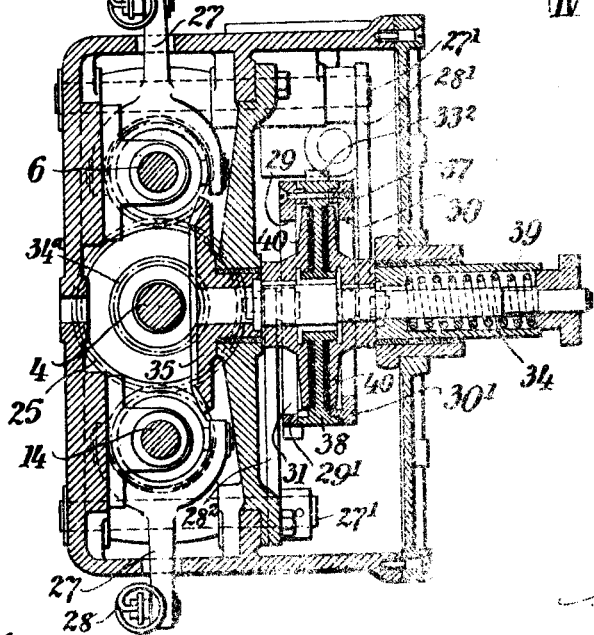
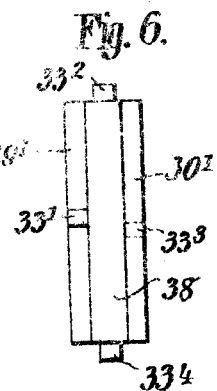
Witnesses:
Inventor:
Julius Grundstein
By Davis & Davis
Attorneys

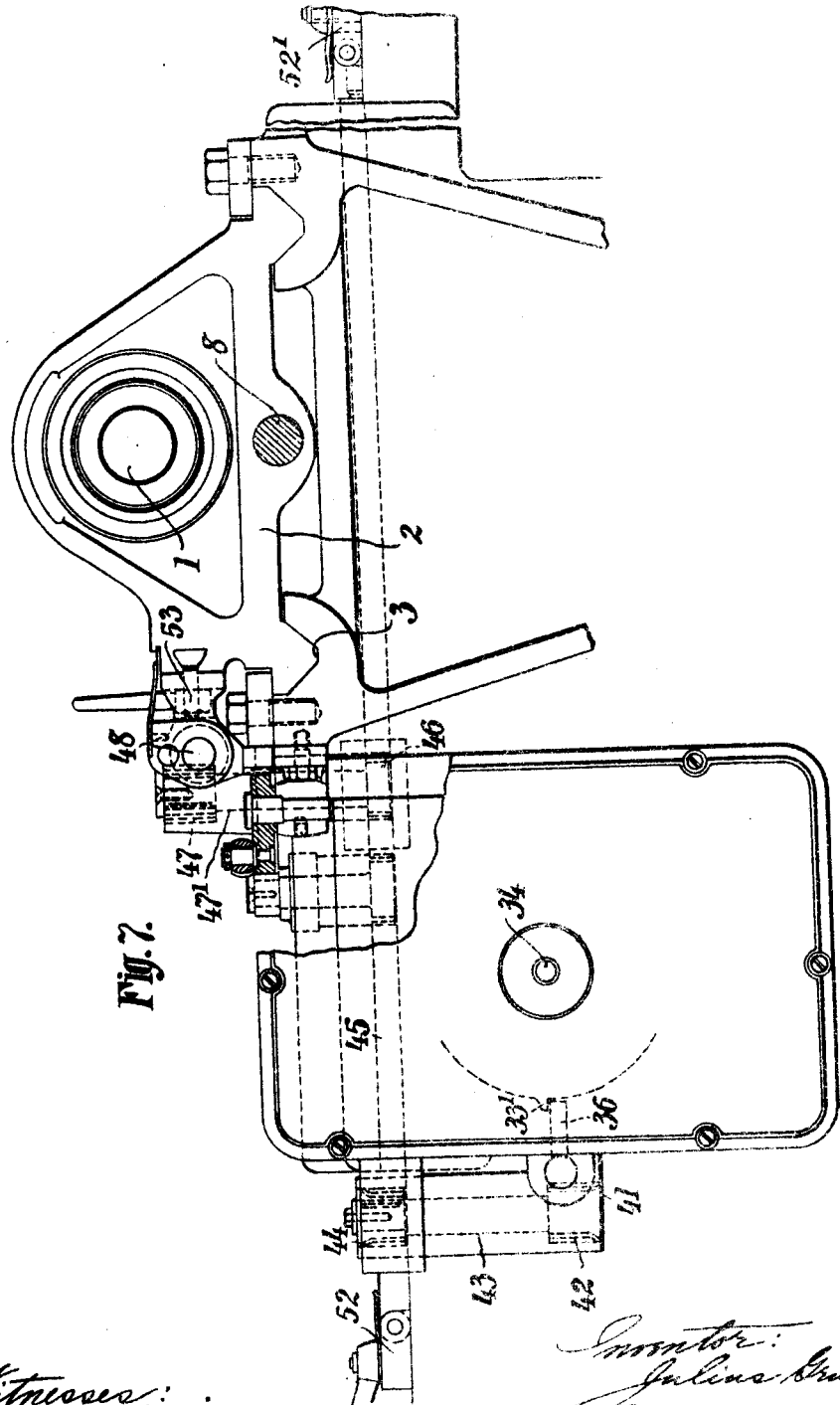

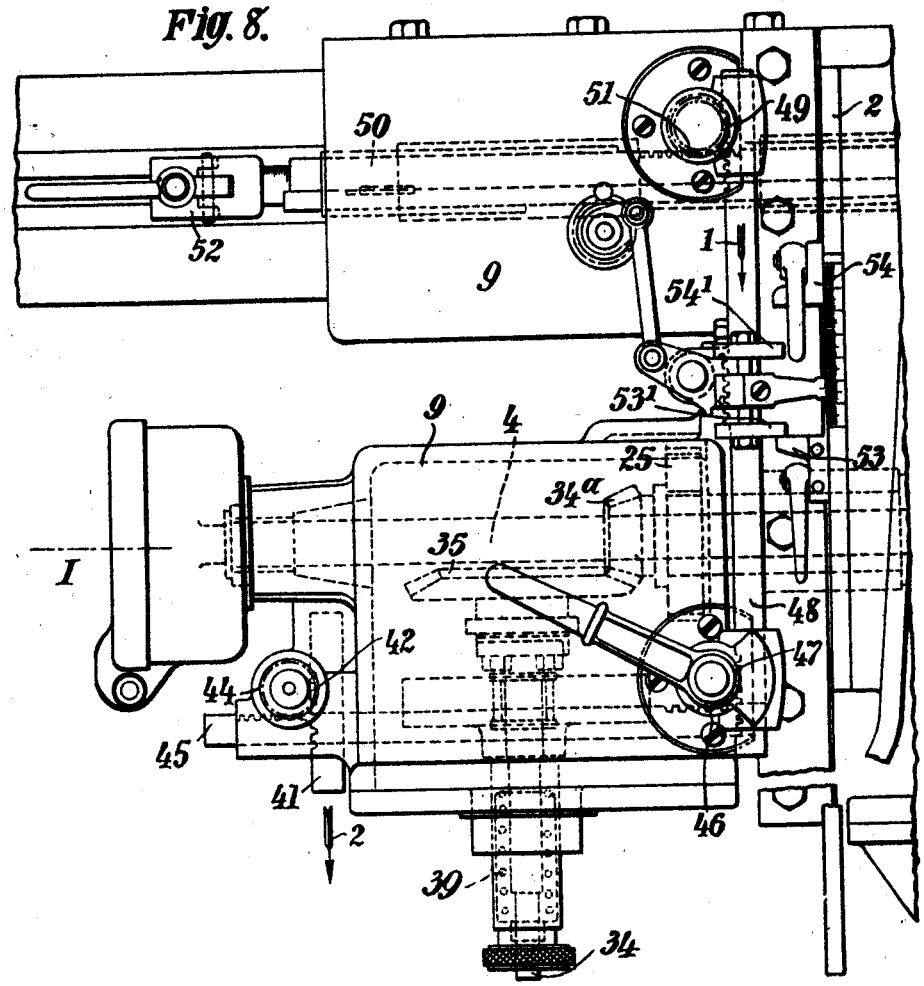

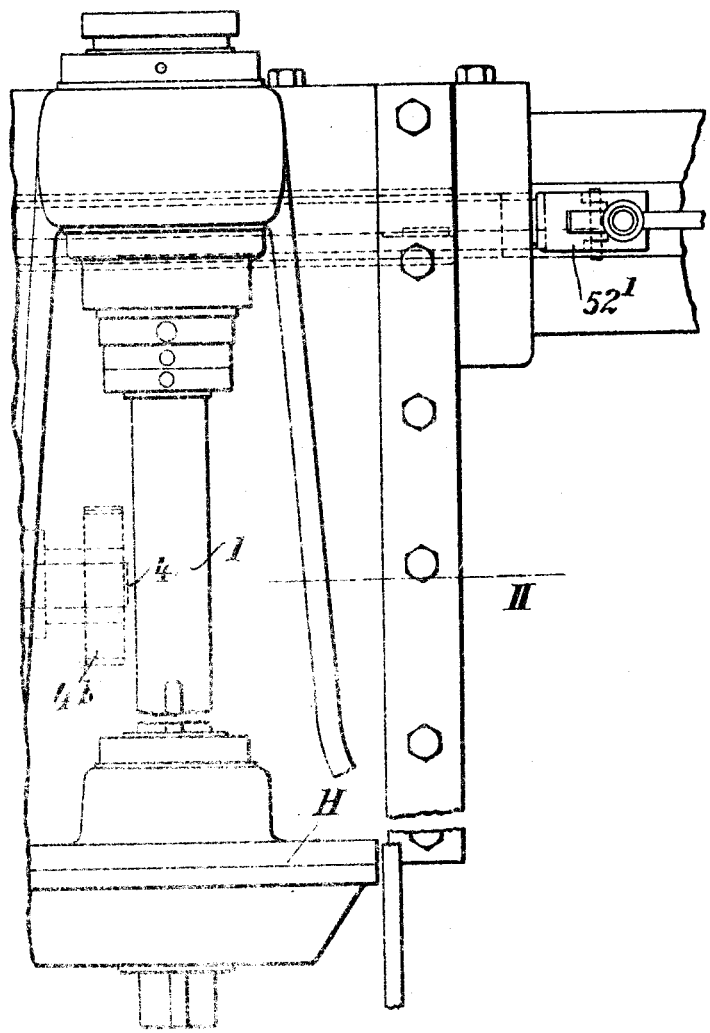

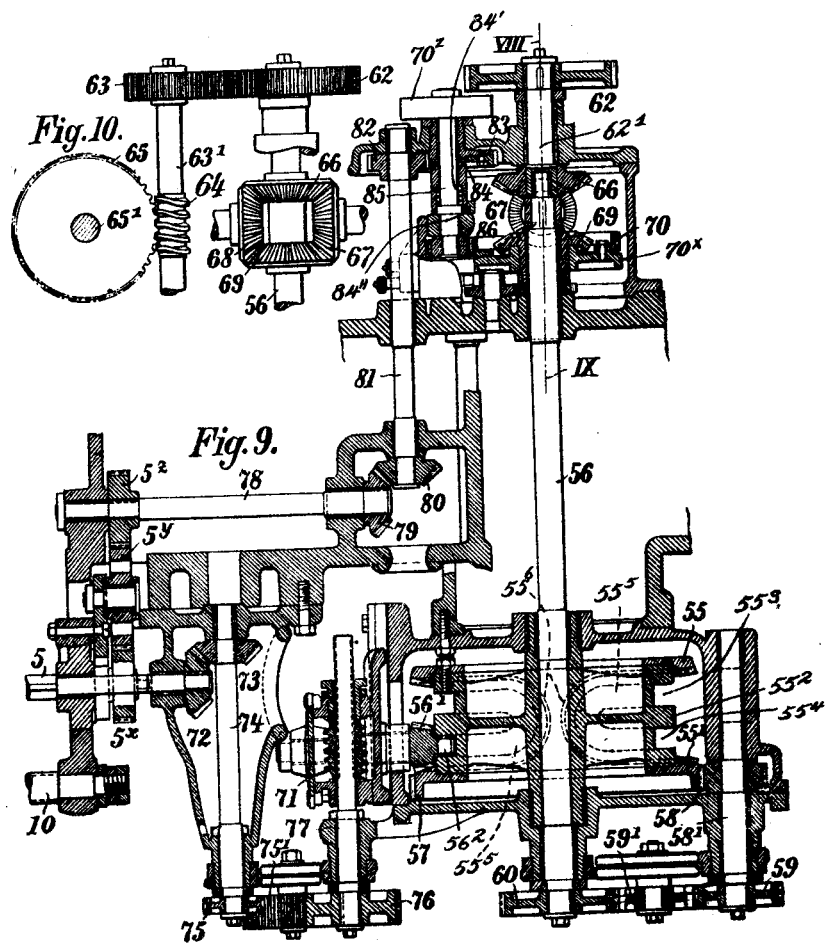

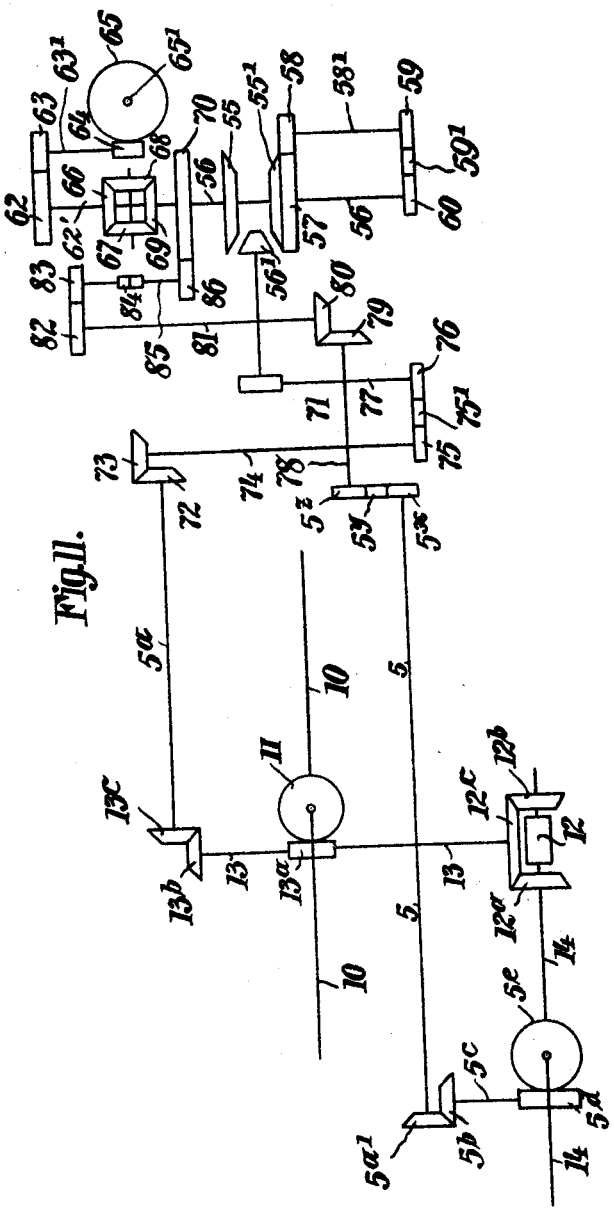

J. GRUNDSTEIN.
MACHINE FOR THE AUTOMATIC MANUFACTURE OF WHEELS WITH ANGULAR OR DOUBLE HELICAL TEETH.
APPLICATION FILED JAN. 14, 1913.
Patented June 6, 1916.
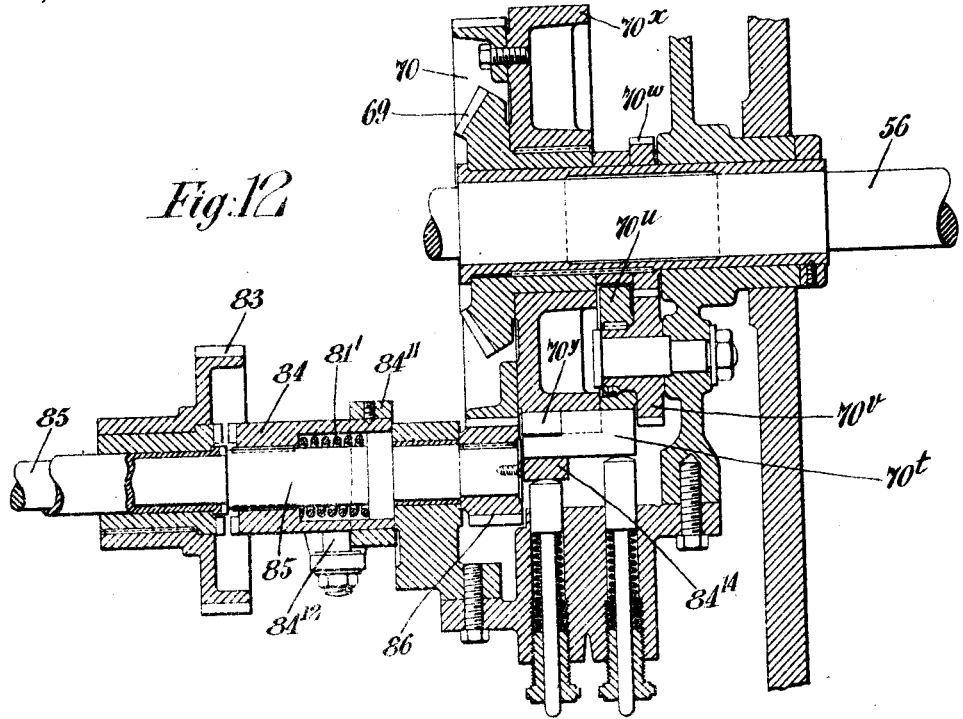
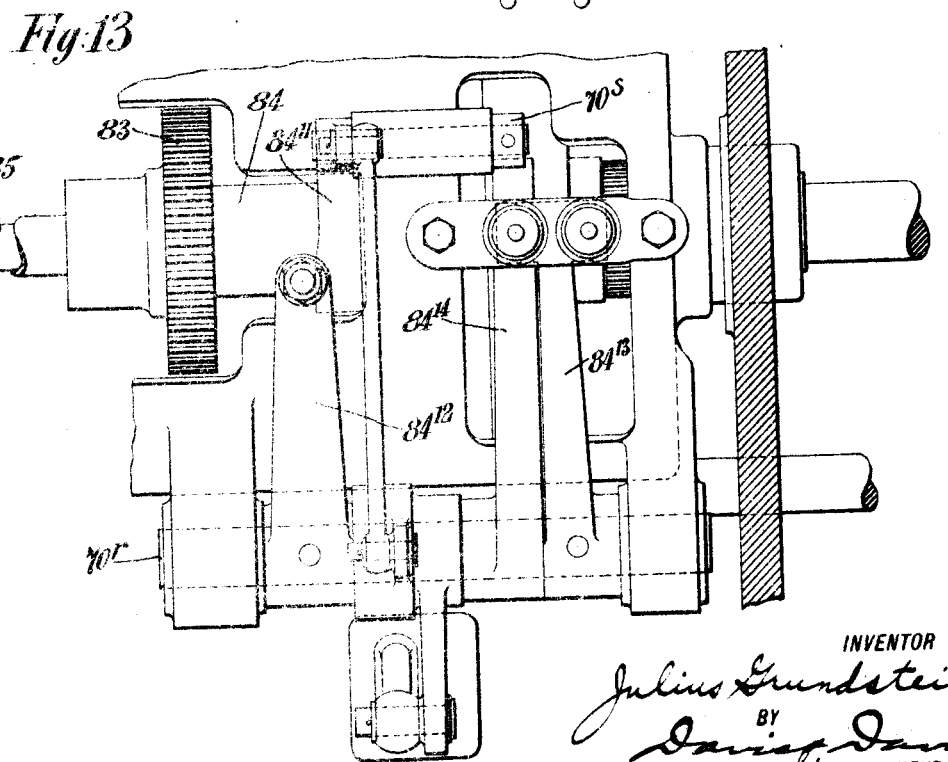
INVENTOR
Julius Grundstein
BY
Davis Davis
his ATTORNEYS.

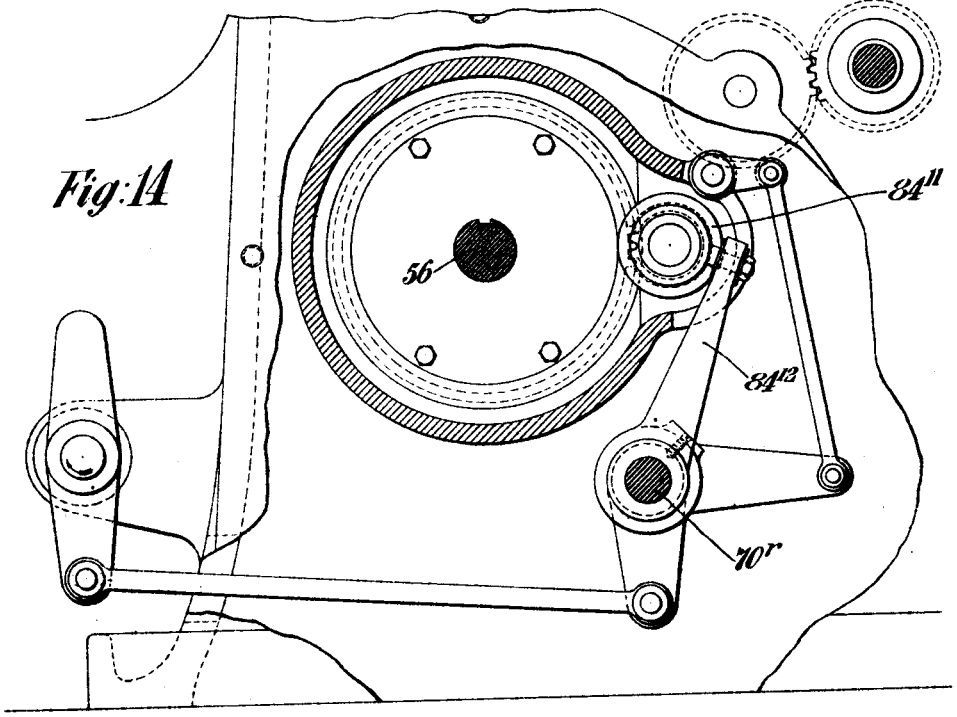
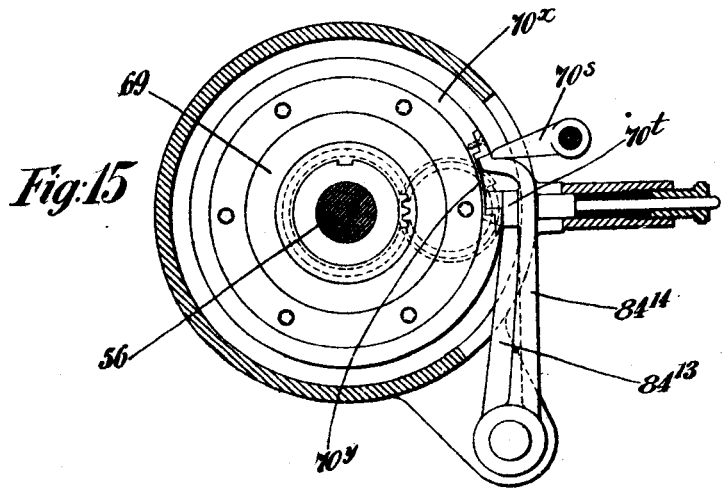

UNITED STATES PATENT OFFICE.

JULIUS GRUNDSTEIN, OF ETTLINGEN, GERMANY, ASSIGNOR TO MASCHINENFABRIK LORENZ, OF ETTLINGEN, GERMANY, A FIRM.

MACHINE FOR THE AUTOMATIC MANUFACTURE OF WHEELS WITH ANGULAR OR DOUBLE HELICAL TEETH.

1,185,657.  Specification of Letters Patent.  Patented June 6, 1916.

Application filed January 14, 1913. Serial No. 741,915.

*To all whom it may concern:*

Be it known that I, JULIUS GRUNDSTEIN, a subject of the Emperor of Russia, residing at Ettlingen, Grand Duchy of Baden, in the German Empire, have invented certain new and useful Improvements in Machines for the Automatic Manufacture of Wheels with Angular or Double Helical Teeth, of which the following is a full, clear, and exact description.

This invention relates to machines for the automatic manufacture of wheels with angular or double helical teeth in which the milling cutter describes a rectangular movement, and the blank is turned to and fro during the milling, in accordance with the angle of pitch of the angular teeth.

It has for its object to provide a machine enabling the division of the pitch circle to be automatically effected, and the double helical teeth to be automatically cut, in one operation, which was hitherto impossible in the machines of that kind with which I am familiar.

To that end, the invention consists in the new arrangement and combination of the single machine parts, more particularly of the reversing and feed device, as will be hereinafter described with reference to the drawings, in order to move the milling cutter alternately from the driving gear for the blank and the driving gear for the milling spindle, in the direction of the axis of the blank and at a right angle to the same, as well as to turn or swing the blank to and fro and to advance it.

A construction according to this invention is illustrated by way of example in the accompanying drawings.

Figure 1 shows the general arrangement of the machine in front elevation. Fig. 2 is an end elevation of the machine seen from the left in Fig. 1 and drawn on an enlarged scale. Fig. 3 is an enlarged longitudinal section through the longitudinal slide adjustable parallel to the axis of the blank, on line I—II of Fig. 8. Fig. 4 is a front elevation of the device, mounted in the longitudinal slide, for controlling the milling cutter or the longitudinal and the transverse slides. Fig. 5 is a section on line III—IV of Fig. 4. Fig. 6 is an edge view of a control disk seen at a right angle to its axis. Fig. 7 is a front elevation of the longitudinal slide, some parts being shown in section. Figs. 8 and 8ª show the two slides and a portion of the machine in plan. Fig. 9 is a section on broken line V—VI—VII of Fig. 1. Fig. 10 is a vertical section on line VIII—IX of Fig. 9. Fig. 11 shows diagrammatically the driving gear of the blank. Fig. 12 is a detail sectional view of a part of the mechanism for rotating the blank holder. Fig. 13 is a side elevation of the mechanism shown in Fig. 12. Fig. 14 is a detail sectional view showing the mechanism of Fig. 12 in end elevation. Fig. 15 is a similar view to Fig. 14, showing the means for locking the blank feeding means. Figs. 3—8 are drawn on approximately the same scale, and the scale of Figs. 9 and 10 is somewhat smaller than that of Figs. 3—8.

The blank A (Fig. 1) is mounted in the known manner between a movable head stock C adjustably mounted in the machine frame B, and a dividing head D, and, more particularly when it is a question of large blanks, can be secured in its central position by means of supporting rollers E.

The machine is driven either from a line shaft by means of a belt $F^1$, for which purpose the machine is provided with a pulley F, or it can be driven in any well-known manner by means applied in the place of the pulley F.

The spindle G of the pulley F drives continuously by means of a well-known change gear box I, a spindle $G^1$ which, by means of a pinion $G^2$ which is mounted adjustably in a groove on the same, rotates an oblique spindle $H^1$ (Figs. 1 and 2). The latter transmits its rotation by means of a bevel wheel gear $H^0$ to the spindle 1 of the milling cutter P for cutting the wheel. The spindle 1 is adjustably guided in the bevel wheel H by means of a groove (Fig. 8). The gears $G^2$, H, $H^0$ and the oblique spindle $H^1$ are preferably surrounded by guard cases.

For moving the milling cutter P normally or parallel to the axis of the blank, a transverse slide 2 and a longitudinal slide 9 (Figs. 1 and 2) are provided, the movements of which are controlled by means of a driving and controlling device hereinafter described.

The milling cutter spindle 1 is mounted in the transverse slide 2 which is adjustable normally to the axis of the blank, in guides 3 of the longitudinal slide 9. The steering device for the movements of the two slides is arranged in the longitudinal slide 9.

The spindle G (Fig. 1) continuously rotates, by means of a spur wheel gear J, the spindle 5 mounted in the machine frame, with the same number of revolutions and always in the same direction. In the same way, the spindle 4 (Figs. 2 and 3) mounted in the longitudinal slide 9, is always and continuously rotated in the same direction from the spindle G, namely by means of the spindle $G^1$, oblique spindle $H^1$ and a worm $4^a$ (Fig. 2) mounted on the latter and transmitting its rotations to the toothed wheel $4^b$ (Figs. 2 and 3) of the spindle 4, by means of a toothed wheel gear mounted on the slide 9, but not shown separately for the sake of greater clearness. From the two spindles 4 and 5 are obtained all the movements of the two slides and of the blank, as will be hereinafter described.

A worm 7 connected to a spindle 6 (Fig. 3) mounted in the slide 9, rotates a wormwheel nut 8 (Fig. 3) mounted in the cross slide 2 and moving the slide 2 to or fro normally to the axis of the blank, in accordance with the direction of rotation given to it.

The movement of the longitudinal slide 9 is obtained by means of a worm wheel nut 11 (Fig. 3) mounted on the screw spindle 10 secured to the machine frame, which nut is rotated to the right or to the left or stands still, this being effected by means of the coupling 12, the bevel wheel gear $12^a$, $12^b$, $12^c$ the spindle 13 mounted transversely in the longitudinal slide 9, and the worm $13^a$ mounted on the said spindle, according to the setting of the coupling 12.

The cross spindle 13 transmits its rotation at the same time to the grooved spindle $5^a$ (Figs. 1—3 and 11) mounted in the machine frame. To that end, on the cross spindle 13 is mounted a bevel wheel $13^b$ (Fig. 11) engaging with a bevel wheel $13^c$ mounted in the slide 9, so that it cannot move axially, but can rotate. The bevel wheel $13^c$ is mounted in a longitudinally adjustable manner on the grooved spindle $5^a$ in the groove $5^2$, so that it transmits its rotary motion to the said spindle $5^a$ which effects the swinging of the blank simultaneously with the longitudinal advance of the milling cutter, as hereinafter described.

For reversing the direction of rotation of the spindles 6 and 14, couplings 15, 16, 17 and 18 (Fig 3) are provided. By means of the couplings 15 or 17, the spindle 14 or the spindle 6, can be coupled with the spindle $21^a$ or $22^a$ respectively driven from the spindle 4 by means of change wheels 19, 21 or 20, 22, so that the spindle 6 or 14 will be driven from the spindle 4. When the spindle 6 is coupled in that way to the spindle 4, the cross slide 2 will be brought nearer to the blank A, in order to enable the milling cutter to work into the blank to the desired depth. If, however, the spindle 14 is coupled to the spindle 4, the longitudinal slide 9 will receive an advance movement (that is to say, with reference to Fig. 1, a longitudinal movement to the left), in order that the milling cutter which has worked into the blank, may cut out from the blank the tooth gap to be made.

The toothed wheels $22^b$ or 23 mounted loose on the spindles 6 and 14, can be connected to the said spindles by means of the coupling 16 or 18 (Fig. 3). The wheel 23 is driven from the spindle 5, the rotation of the latter being transmitted by the bevel wheels $5^{a1}$, $5^b$ (Figs. 3 and 11) to a short cross spindle $5^c$, and from the latter, by means of the worm wheel gear $5^d$, $5^e$, to the hub of the wheel 23. In order to enable the slide 9 to be moved at the same time relatively to the spindle 5, the bevel wheel $5^{a1}$ mounted in the slide 9 in a rotatable but not longitudinally adjustable manner, is adjustable on the spindle 5 in the groove $5^1$. This transmission device between the spindle 5 and the toothed wheel 23 on the spindle 14, has been omitted in Fig. 2 of the drawing, for the sake of clearness.

The rotation of the wheel 23 is transmitted by means of the intermediate wheel 25 to the toothed wheel $22^b$. By means of the said wheels $22^b$ and 23, the spindles 6 and 14 are rotated in the opposite direction, so that at the end of the longitudinal advance of the slide 9, the milling cutter, moving away from the blank in the horizontal direction, comes out of the milled out tooth gap or returns to this disengaged position, parallel to the axis of the blank, in the direction opposite to the previous longitudinal advance (to the right with reference to Fig. 1), to its initial position. Owing to the couplings 15, 16, 17 and 18 connecting in a suitable sequence the spindles 6 and 14 to the driving spindles 4 and 5, the milling cutter P executes therefore automatically a movement in the shape of a rectangle hereinafter more fully described. For those movements of the milling cutter P, during which it has no work to do, it is preferable to provide greater speeds.

The couplings 15, 16, 17 and 18 are controlled by means of double-armed bifurcated levers 27 mounted in the longitudinal slide 9 on pins $27^1$ (Figs. 3—5). The outer arms of the levers 27 are connected together in pairs by means of springs 28 having the tendency to turn the bifurcated levers 27 in such manner that they exercise on the couplings a pressure having the tendency to throw them into gear. This throwing into gear or engagement is however prevented by the operating or feed levers $28^1$, $28^2$, $28^3$, and $28^4$ connected to the levers 27 and extending in the opposite direction to the outer arms of the levers 27. The operating levers $28^1$, $28^2$, $28^3$, and $28^4$ engage with their ends from both sides with grooves 29 or 30 of control disks $29^1$ and $30^1$ arranged between the levers $28^1$ and $28^3$ on the one side and $28^2$ and $28^4$ on the other side, on a spindle 34. The grooves hold the levers $28^1$, $28^2$, $28^3$ and $28^4$ together in opposition to the tension of the springs 28, in such a manner that the couplings 15—18 remain out of engagement. Each of the circular grooves 29 or 30 provided on the outside of the disk $29^1$ or $30^1$, is provided in the radial direction with a recess or a widened portion 31 or 32. The widened portion 31 of the groove 29 of the disk $29^1$, is arranged at an angle of 90° relatively to the widened portion 32 of the groove 30 of the disk $30^1$. If during the rotation of the disks, one of the levers $28^1$—$28^4$ engages with its end with such a recess 31 or 32, it will be turned away from the spindle 34, which will bring about the throwing into gear of the corresponding coupling by the corresponding bifurcated levers 27.

In order to throw consecutively into gear the couplings 15, 16, 17 and 18, the controlling disks $29^1$ and $30^1$ secured together, are intermittently rotated. This is effected by providing on the circumference of the disks, or of the drumlike body constituted by the same with the assistance of the disk 38, staggered cams or tappets $33^1$, $33^2$, $33^3$ and $33^4$ (Figs. 4—6) which can engage with a stop 36 adjustable parallel to the spindle 34 of the disks, according as the said stop is brought into the path of the cams. The rotation of the disks $29^1$ and $30^1$ is obtained from the spindle 5, or from the bevel wheel $34^a$ connected to an intermediate wheel 25 (Figs. 3—6) driven from the spindle 5, the said bevel wheel $34^a$ engaging with a bevel wheel 35 (Fig. 5) on the spindle 34 of the disks. As the spindle 5, and therefore the wheels 23, 25, $34^a$ and 35 and the controlling disk spindle 34, are continuously rotating, a yielding coupling or connection is inserted between the disks $29^1$ and $30^1$ and their spindle 34, the said coupling being in the present construction a friction coupling. The disks $29^1$ and $30^1$ connected to each other by means of screws 37 (Fig. 5), are secured to a coupling disk 38 (Figs. 5 and 6), mounted rotatably or loosely on the spindle 34 of the disks. Against the said coupling disk 38 are pressed from both sides by the spring 39 friction or coupling disks 40 mounted in a non-rotatable but longitudinally adjustable manner on the spindle 34, so that the rotation of the wheel 25 or of the spindle 34 is transmitted to the controlling disk body, when the stop 36 releases one of the cams $33^1$—$33^4$. When, on the contrary, the controlling disk body is stopped by the stop 36 engaging with one of its cams, the friction disks 40 will slide on the disk 38, without driving the latter.

For the purpose of shifting the stop 36 (Figs. 4, 7 and 8), the latter is secured to a toothed rack 41 engaging with a toothed wheel 42 controlled by means of a vertical spindle 43, of a toothed wheel 44, of a toothed rack 45, of toothed wheels 46, 47 on the vertical spindle $47^1$, of a toothed rack 48 and of a toothed wheel 49, either by the longitudinal or by the cross slide (Figs. 7 and 8.)

In the longitudinal slide 9 is adjustably mounted a toothed rack 50 (Fig. 8) engaging with a toothed wheel 51 secured to the vertical spindle of the toothed wheel 49. The ends of the toothed rack 50 form stops and at the end of the longitudinal movements of the slide 9, strike the stops 52, $52^1$ adjustably mounted on the machine frame. The toothed rack 48 can be also shifted by means of stops 53 and 54 provided on the cross slide 2, so that the stop 36 can release the controlling disk body $29^1$, 38, $30^1$ also when the slide 2 is shifted.

The swinging or turning of the blank required for producing angle shaped or double helical teeth is derived from the spindle $5^a$ (Figs. 1, 3, 9, 10 and 11) which is actuated from the spindle 14 so that the said turning takes place simultaneously with the longitudinal movement of the slide 9 as the longitudinal movement of the slide is also derived from the spindle 14. The driving device for the blank, which is mounted on the right hand end of the machine (Fig. 1), consists of a reversing device constituted by two bevel wheels 55, $55^1$ (Fig. 9), mounted loose on a spindle 56 and driven by means of a bevel wheel $56^1$ which can be alternately brought into engagement with one or the other of the two bevel wheels 55, $55^1$. The shifting and the rotation of the bevel wheel 56 are effected by means of a worm gear 71 which receives its right or left hand drive from the grooved spindle $5^a$ by means of the bevel wheel gear 72, 73 of the spindle 74, the toothed wheels 75, $75^1$, 76 and the spindle 77.

The bevel wheels 55 and $55^1$ are both carried by disks which are united with a drum $55^2$ and a toothed wheel 57 to form one body loosely mounted on the spindle 56. Two grooves $55^3$ and $55^4$ are provided on the outer surface of the drum $55^2$ the ends of which grooves do not meet, but are connected by arch-shaped grooves $55^5$, so that a guiding groove $55^3$, $55^5$, $55^4$, $55^5$ closed on itself is obtained, in which groove engages the tail-piece $56^2$ of the spindle of the driving wheel $56^1$. The toothed wheels 55 and $55^1$ move parallel to the guiding groove and are connected together by arch-shaped teeth $55^6$. If the driving wheel $56^1$ meshes with the toothed wheel $55^1$, the toothed wheel 57 is rotated in one direction until the wheel $56^1$ leaves the part $55^4$ of the guiding groove, passes the arched part $55^5$ and enters the part $55^3$ of the guiding groove, when the wheel $56^1$ comes into engagement with the toothed wheel 55. The direction of rotation is thus reversed and the toothed wheel 57 rotated in the opposite direction until the driving wheel $56^1$ meshes again with the wheel $55^1$ by the action of the other arched parts of the groove $55^5$ and the teeth $55^6$. This reversing of the rotation of the wheel 57 is repeated after each change of the wheel $56^1$ from one part $55^3$ of the groove into the other part $55^4$ thereof, and conversely. Reversing gears of this kind are known in themselves. The toothed wheel 57 secured to the bevel wheel $55^1$ of the reversing device, is in engagement with a toothed wheel 58 of a spindle $58^1$, which, by means of intermediate wheels 59, $59^1$ and 60, drives the spindle 56 on which the reversing device is mounted. The movement of the spindle 56 is transmitted through differential gear subsequently described and spur gears 62 and 63 (Fig. 10), to a spindle $63^1$ and a worm 64 (Fig. 10) mounted on the same and engaging with a worm wheel 65, to the spindle $65^1$ of which is also secured the dividing head D of the blank A.

The turning of the blank is operated as follows: Assuming that the bevel wheel $56^1$ is in engagement with the bevel wheel $55^1$ and that there is a connection between the driving spindle 4 and the spindle 14, the connection produced will rotate the spindle 77 and the bevel wheel $56^1$ which rotates the bevel wheel $55^1$ and consequently also the toothed wheel 57 in one direction. At the same time the milling cutter has started its longitudinal working travel and the cutting of a tooth gap.

When the bevel wheel $56^1$ reaches one of the arched parts $55^6$, the bevel wheel $56^1$ with its driving mechanism will follow the curve of the arched part, the casing carrying the driving mechanism moving on the spindle 77. Owing to the rotation of the bevel wheel $55^1$, the wheel 65 and the blank fixed on the dividing head D, will be turned, the rotation of the bevel wheel $55^1$ being transmitted by the spindle $58^1$, change wheels 59, $59^1$, 60, spindle 56, a differential gear 69, 68, 67, 66, spindle $62^1$, dividing change wheels 62, 63, spindle $63^1$, and the worm 64, to the wheel 65. The differential gear 66—69 forms here merely a connecting member between the two spindles 56 and $62^1$ and rotates as a rigid whole. In this way, the dividing change-wheels 62, 63 are also utilized for turning the blank.

As long as the bevel wheel $56^1$ drives the bevel wheel $55^1$, the wheel 65 will be rotated in one direction, that is to say, the blank turned in one direction, until one of the arched parts $55^6$ moves the wheel $56^1$ away from the bevel wheel $55^1$. In this way is produced the first flank of the double helical tooth. At the apex of the corresponding arched part $55^6$, the turning movement of the reversing gear, and of the wheel 65, and therefore also the turning of the blank are equal to 0. This point is the point of reversal of the turning of the blank, that is to say, also of the double helical tooth.

If the bevel wheel $56^1$ passes on to the bevel wheel 55, the direction of rotation of the reversing gear will be changed, and the wheel 65 will be rotated in the opposite direction from the preceding one, and the blank will be turned backward. During this backward turning of the blank, the second flank of the double helical tooth is produced. It goes without saying that the whole double helical tooth is the resultant of the longitudinal movement of the milling slide and of the simultaneous turning forward and backward of the blank. When the second flank, and therefore the whole double helical tooth gap is finished, the connection between the spindle 4 and the spindle 14 is interrupted. This stops, of course, the longitudinal working travel of the milling cutter, and the turning movement of the blank.

When the milling cutter is withdrawn from the tooth gap just cut, the longitudinal milling carriage is quickly brought back by the spindle 14 being connected to the blank driving spindle 5. A turning to and fro of the blank then takes place in an exactly similar manner during the idle longitudinal travel of the milling cutter.

Almost simultaneously with the throwing into gear of the coupling 18, is thrown into gear also the coupling 84, whereby the wheel 65, and the blank, is given during the idle longitudinal return of the milling cutter by the mechanisms 5, $5^x$, $5^y$, $5^z$, 78, 79, 80, 81, 82, 83, 84, 85, 86, 70, 69, 68, 67, 66, 62, 63 and 64, an additional rotary motion which is added by the differential gear 66—69 to the turning movement of the blank as a feed advance. Owing to this additional feed motion, the blank is advanced in such manner that when the longitudinal idle return of the milling cutter is finished, or when the transverse working advance of the same begins, it is opposite not the entrance point of the tooth gap which has been just milled, but a point which is distant therefrom to the extent of one pitch. If, after the couplings 84 and 18 have been disconnected, the working feed or the working movement of the milling cutter continues, the next following double helical tooth gap will be cut in the blank which, for the purpose of producing the broken helical line, is turned forward and then backward.

The result of the coöperation of the change wheels 59, 59¹ and 60 with the differentially driven dividing change wheels 62, 63 during the idle longitudinal return of the milling cutter is that the milling cutter does not move in the path of the tooth gap cut from left to right, but in an angular path (broken helical line) parallel to the cut tooth gap, at a distance from it of one pitch.

The change wheels 62 and 63 are division change wheels. But they also have an influence for obtaining the angle. The wheels $5^x$, $5^y$ and $5^z$ are only transmitting wheels for driving the automatic division apparatus of the spindle 5. The worm spindle $63^1$ is therefore actuated from the spindle 81 through the division change wheels 62 and 63 when the blank is to be indexed, and from the spindle 56 for reversing the blank to obtain the angle. Both movements can take place simultaneously during the return stroke of the cutter slide.

The differential gear hereinbefore referred to is arranged and operates as follows: To the spindle of the spur wheel 62 is secured the bevel wheel 66 with which engage the bevel wheels 67 and 68 of the differential gear (Figs. 9 and 11). The bevel wheels are carried around by the shaft 56 and are also in engagement with the bevel wheel 69 driven by a spur wheel 70 secured to it. The drive of the spur wheel 70 is derived from the spindle 5 of the machine in a suitable manner, for instance by means of the spur wheel $5^x$ (Figs. 1 and 11) mounted on the spindle 5, gear wheels $5^y$, $5^z$, the spindle 78, bevel wheels 79, 80, spindle 81, the wheels 82, 83, the coupling 84, the spindle 85 and the toothed wheel 86, in such a manner that the wheel 70 moves only when the slide 9 is operated by the coupling 18, that is to say, when the milling cutter is returned to its initial position parallel to the axis of the blank. It is therefore necessary to provide a suitable device effecting the throwing into gear of the coupling 84 simultaneously with the throwing into gear of the coupling 18.

The coupling 84 is acted on by a spring $84^i$ which tends to keep the coupling members engaged. The movable member of the coupling 84 carries a cam piece $84^{11}$, said cam piece being adapted to be engaged by a lever $84^{12}$, the pin of said lever engaging the face of the cam piece as it rotates and withdrawing the movable coupling member, thereby permitting wheel 83 to run loosely on its shaft 85. Secured to the wheel 70 is a drum $70^x$, said drum being formed with a recess $70^y$ in its periphery. Mounted to turn with the drum $70^x$ is a gear $70^w$ which engages a gear $70^v$ mounted on a spindle secured to the main frame. Carried by this latter gear is a locking disk $70^u$ which is provided with a slot in its circumference, said slot being adapted to be brought into alinement with the recess in the periphery of the drum $70^x$. The lever $84^{12}$ is rigidly secured to a rock shaft, and to said shaft is secured a second lever $84^{13}$ which is pressed inwardly by a spring, and said lever carries a cross head $70^t$ which bears on the periphery of the locking disk and maintains the lever $84^{12}$ out of engagement with the coupling 84, and also holds the cross head of lever $84^{13}$ out of engagement with the drum $70^x$. The slots in the locking disk and in drum $70^x$ are of suitable length, for a purpose which will hereinafter appear. Mounted loosely on the rock shaft carrying the levers $84^{13}$ and $84^{12}$ is a locking lever $84^{14}$, the upper end of which is adapted to engage in the locking recess in the drum $70^x$, this latter lever serving to stop the drum the instant the coupling 84 is disconnected; and said lever is pressed inwardly by means of a suitably mounted spring. A locking pawl $70^s$ engages the upper end of lever $84^{14}$ and locks it in engagement with drum $70^x$. This locking pawl is released through the link and crank arm connected to the rock shaft operating levers $84^{12}$ and $84^{13}$. The rock shaft $70^r$ is connected by a crank and link mechanism to a tripping arm which is moved by the carriage 2 when the said carriage reaches the limit of its outward movement after withdrawing the cutter from the blank, at which point the coupling 18, hereinbefore described, is thrown into engagement to start the return idle movement of the cutter. It is during this return idle movement that the feeding operations of the change wheels 62 and 63 take place. The rock shaft $70^r$ may be operated in any suitable manner and from any part of the mechanism, it being only necessary that the lever $84^{12}$ be moved outwardly to release the coupling 84, and that the locking pawl be moved outwardly to release the lever $84^{14}$ at the properly timed interval. It is manifest that when the rock shaft $70^r$ is moved in the proper direction to release the coupling 84 the locking pawl $70^s$ will be disengaged from the lever $84^{14}$ and said lever may then be moved outwardly with the lever $84^{13}$, the cross head on lever $84^{13}$ engaging the inner side of said lever $84^{14}$. When the slots in the locking disk and drum register and are in alinement, lever $84^{13}$ will snap into them, thereby carrying inwardly lever $84^{12}$ and causing it to engage the cam piece on the coupling. The slots in the locking disk and drum are long enough to permit the rotation of the cam piece and the consequent withdrawal or disconnection of the coupling. As soon as the coupling is disconnected the locking lever $84^{14}$ snaps into place and prevents further rotation of the drum $70^x$. At the same time the locking pawl drops back of the said lever 84^14 and locks it in position, where it remains until the next movement of the rock shaft in response to the outward travel of the carriage. The part 70^x is a fly wheel which insures steady working of the mechanism.

The dividing change wheels 62 and 63 are calculated according to the number of teeth to be milled, and mounted on their spindles while the wheels 59 and 60 are obtained for each angle by calculation.

In that arrangement of the change wheels, the angles of the wheels to be milled for different numbers of teeth will be exactly identical.

In the arrangement according to this invention, the dividing change wheels 62, 63 are exchanged, to suit the number of teeth, for two wheels meshing with each other in which therefore the pitch is the same, while the change wheels 59, 60 which are chosen or calculated equal to the value tan. α or in proportion to the same, are used for both wheels to be milled. If in one wheel it is necessary to deviate from the angle α selected, or if it is possible to reach the same only approximately, as the value tan. α can not be formed with the proportion of the numbers of teeth of the available change wheels, the deviation from the angle α is also transmitted to the second wheel to be milled, as the change wheels 59, 60 selected for one wheel, are used also for the second wheel. The angle α which is obtained in the two wheels is therefore always the same.

The working of the machine is as follows:—The milling cutter P is for instance assumed, with reference to Figs. 1–8 to have effected a cut with the movement of the slide 9 toward the left and to have already covered at the proper depth the whole width of the blank, and the coupling 16 is assumed to have been thrown into gear in the manner shown in Fig. 3, owing to the lever 28^1 (Fig. 4) having sprung into the recess 32 of the groove 30 of the disk 30^1. In that way, the toothed wheel 22^b has been connected to the spindle 6, and the worm wheel gear 7, 8 withdraws the cross slide 2, and therefore the milling cutter, from the blank, until the adjustable stop 54 (Fig. 8) provided on the slide 2, strikes the stop 54^1 connected to the toothed rack 48, and in that way imparts to the tooth rack a movement in the direction of the arrow 1. This movement of the toothed rack 48 is transmitted by means of the wheels 47 and 46 to the toothed rack 45, and the movement of the latter—by the wheels 44 and 42—to the toothed rack 41, whereby the stop 36 provided on the latter, will be shifted in the direction of the arrow 2, that is to say, in the direction of the axis of the controlling disk body 29^1, 38, 30^1, so that it comes out of the path of the cam 33^1 (Figs. 4 and 6) of the controlling disk body engaging with it and the latter can make a quarter of a revolution, until the next cam 33^2, in the path of which the stop 36 is now situated, strikes the said stop 36, and in that way again stops the controlling disk body. Owing to this quarter of a revolution of the disk, the coupling 16 is disengaged by the renewed inward pressure of the lever 28^1, and the coupling 18 thrown into gear by the engagement of the lever 28^2 with the recess 31 of the groove 29 of the disk 29^1, and in that way the spindle 14 is connected to the toothed wheel 23. The longitudinal slide 9, and with it, of course, the milling cutter previously moved out of the blank, will be now moved parallel to the axis of the blank, with reference to Figs. 1 and 8, to the right. During this longitudinal movement of the slide 9 to the right, owing to the engagement of the coupling 84 (Fig. 9), the dividing device for the blank will be coupled at the same time to the continuously rotating spindle 5. In that way the wheel 70 (Fig. 9) is rotated, and consequently the blank is turned to the extent of one tooth division. At the end of the right hand movement of the slide 9, the toothed rack 50 strikes the stop 52^1 situated on the right in Figs. 7 and 8, so that it is correspondingly shifted relatively to the longitudinal slide. This movement is transmitted by the wheels 51 and 49 (Fig. 8) again in the direction of the arrow 1, to the toothed rack 48 which in that way shifts the stop 36 still farther to the side, in the direction of the arrow 2, so that the cam 33^2 at the moment engaging with the stop 36, is deprived of its abutment, whereupon the controlling disk body thus released, is further rotated. After another quarter revolution of the controlling disk body, the cam 33^3 strikes the stop 36, so that the controlling disk body is again stopped. In that position of the parts, the end of the lever 28^3 is in engagement with the recess 32 of the disk 30^1, the coupling 18 is out of gear and the coupling 15 in gear. In that way the spindle 6 is connected to the spindle 4, and the slide 2 is again advanced toward the blank, until the milling cutter has worked into the blank to the desired depth. At the end of this new advance of the slide 2, the latter strikes with its stop 53 against the stop 53^1 of the toothed rack 48, whereby the latter is moved in the direction opposite to the previous one, that is to say, in the opposite direction to the arrow 1, which results in the stop 36 being moved back in the direction opposite to the arrow 2, and consequently in the cam 33^3 and the controlling disk body being released, so that the latter can turn forward again. Owing to this rotation, the coupling 15 is then thrown out of gear and the coupling 17 into gear, owing to the engagement of the lever 28⁴ with the recess 31 of the disk 29¹. Owing to the cam 33⁴ striking the stop 36 which, owing to its movement back out of the path of the cam 33³, has been brought back into the path of the cam 33⁴, the controlling disk body has again been stopped. The spindle 4 is then connected to the spindle 14, whereby, on the one hand, the longitudinal slide 9 is shifted to the left with reference to Figs. 1 and 8, and at the same time the milling cutter produces the tooth section in the blank, whereupon the working just described is again repeated.

An important characteristic feature of the machine according to this invention is that during the return of the milling cutter to its initial position, that is to say, during the movement of the milling cutter in the direction of the axis of the blank, the driving of the blank is not reversed, but the dividing device of the blank becomes operative. This results first of all in the advantage that two idle movements, the swinging or turning of the blank to the extent of one tooth division or circular pitch, and the movement of the milling cutter into its initial position, are simultaneous, so that in that way time is economized, which is equivalent to a reduction of the idle movements.

Another advantage consists in the fact that it is possible with the machine according to this invention to make wheels which are bounded on both sides by a solid rim or flange, in which therefore the milling cutter cannot come out of the tooth gap by a lateral movement. In order to make the manufacture of such wheels possible, it is not sufficient to remove the milling cutter completely out of the tooth gap by a movement normal to the axis of the blank, but the milling cutter must also be advanced during its movement toward the blank, as the milling cutter during that movement must penetrate into the blank and cut out material from the same.

The construction described and illustrated is a milling machine for the manufacture of double helical toothed wheels, or teeth in which the helical line is broken. If such a machine is to be used for milling simple or ordinary helical tooth wheels with straight helical line, it is merely necessary to replace the reversing or mangle gear 55 and 55¹ by a simple bevel wheel secured to the toothed wheel 57 and always remaining in engagement with the wheel 56¹ which is then not slidable.

By means of the milling machine, it is possible, of course, to manufacture not only angular or double helical teeth, but, when the reversing device 55 is not used, also ordinary spur wheels or wheels with a set of teeth on each half of the wheel breadth and the sets staggered to each other by half a pitch. The controlling device for the milling cutter is therefore suitable also for milling machines which are not intended for manufacturing double helical teeth.

The present invention can be used not only for automatic wheel-cutting machines of the lathe type, but also for automatic double helical wheel machines of the milling cutter machine type as the mechanisms are the same in both types.

I claim:

1. A gear cutting machine comprising a blank holder, a cutter, a slide carrying said cutter, means for moving said slide toward and from the axis of the blank holder, a main slide carrying the cutter slide, means for moving said main slide longitudinally of the blank holder, means for operating said slides and a series of clutches controlling said slide operating means and operated by the slides at the ends of their movements, whereby the cutter will be advanced to and withdrawn from the blank and moved longitudinally thereof both in the cutting operation and in the idle return movement.

2. A gear cutting machine comprising a blank holder, means for giving the blank holder a rotary oscillating movement, means for varying the extent of said oscillations to change the angle of the teeth, an automatically operating means to determine the number of teeth to be cut, and means whereby the number of teeth to be cut in a blank may be varied.

3. A gear cutting machine comprising a blank holder, a milling cutter, means for moving the cutter longitudinally of the blank, means for giving the blank holder a rotary oscillating motion during the cutting movement of the cutter, means for varying the extent of said oscillation to thereby vary the angle of the gear teeth, and means for automatically feeding the blank to cut the desired number of teeth therein, said means being variable, whereby the number of teeth cut in a blank may be varied, the blank oscillating means and the blank feeding means being independently variable.

4. A gear cutting machine comprising a blank holder, means for rotating the blank holder in a step by step movement, a cutter, a slide carrying said cutter, a main slide carrying the cutter slide, means for moving the main slide longitudinally of the blank, means operated by the main slide to control the main slide moving means, means for moving the cutter slide toward and from the axis of the blank holder and means operated by the cutter slide for controlling the cutter slide moving means.

5. A gear cutting machine comprising a blank holder, means for rotating the blank holder in a step by step movement, a cutter, a slide carrying said cutter, a main slide carrying the cutter slide, means for moving the main slide longitudinally of the blank, means operated by the main slide to control the main slide moving means, means for moving the cutter slide toward and from the axis of the blank holder and means operated by the cutter slide for controlling the cutter slide moving means, adjustable means for limiting the back-and-forth movement of the cutter slide and adjustable means for limiting the longitudinal movement of the main slide.

6. A gear cutting machine comprising a blank holder, a main slide, means for moving said main slide longitudinally of the blank holder, a cutter slide carried by the main slide, means for moving the cutter slide inwardly toward the axis of the blank holder at the beginning of the cutting movement, means for moving the cutter slide outwardly away from the blank holder at the end of the cutting movement and means for then returning the main slide to its original position.

7. A gear cutting machine comprising a blank holder, a main slide, means for moving said main slide longitudinally of the blank holder, a cutter slide carried by the main slide, means for moving the cutter slide inwardly toward the axis of the blank holder at the beginning of the cutting movement, means for moving the cutter slide outwardly away from the blank holder at the end of the cutting movement, means for then returning the main slide to its original position and a series of devices adapted to be engaged by the cutter slide at the ends of its reciprocating movements to control the movement of said cutter slide.

8. A gear cutting machine comprising a blank holder, a main slide, means for moving said slide longitudinally of the blank holder, a pair of clutches controlling the main slide operating means, means operated by the main slide at the end of its movement in either direction to control one of said clutches, a cutter slide mounted on the main slide, means for moving said cutter slide toward and from the axis of the blank holder and means engaged by said cutter slide at the ends of its reciprocating movements to stop the said slide.

9. A gear cutting machine comprising a blank holder, a main slide, means for moving said slide longitudinally of the blank holder, a pair of clutches controlling the main slide operating means, means operated by the main slide at the end of its movement in either direction to control one of said clutches, a cutter slide mounted on the main slide, means for moving said cutter slide toward and from the axis of the blank holder, a pair of cutter slide controlling clutches and means engaged by the cutter slide at the end of its movements to operate said clutches.

10. A gear cutting machine comprising a blank holder, means for giving the blank holder a rotary oscillatory movement, a main slide, means for moving said slide longitudinally of the blank holder, a cutter slide carrying the main slide, a cutter carried by said cutter slide, means for operating said cutter, means for moving the cutter slide inwardly at the beginning of the gear cutting operation, means for moving the said slide outwardly at the end of the gear cutting operation, means for moving the main slide back to its original position after the gear cutting operation and means for advancing the blank the distance of one tooth during the return idle movement of the cutter.

11. A gear cutting machine comprising a blank holder, means for giving the blank holder a rotary oscillatory movement, a main slide, means for moving said slide longitudinally of the blank holder, a cutter slide carried by the main slide, a cutter carried by said cutter slide, means for operating said cutter, means for moving the cutter slide inwardly at the beginning of the gear cutting operation, means for moving the said slide outwardly at the end of the gear cutting operation, means for moving the main slide back to its original position after the gear cutting operation and means for advancing the blank the distance of one tooth during the return idle movement of the cutter and means for varying the extent of the rotary oscillatory movement of the blank holder.

12. A gear cutting machine comprising a blank holder, a cutter, means for moving said cutter longitudinally of the blank holder during the cutting and the non-cutting movement of the cutter, means for giving the blank holder a rotary movement during the cutting movement of the cutter, and gear wheels for superposing upon the rotary movement of the blank holder a blank feeding movement during the return non-cutting movement of the cutter, said gears forming a part of the means for rotating the blank holder.

13. A gear cutting machine comprising a blank holder, a cutter, means for moving the cutter toward the axis of the blank, means for then moving it longitudinally of the blank, means for then moving it outwardly and away from the blank, means for moving it longitudinally back to its original position, means for giving the blank holder a rotary oscillating movement during the longitudinal cutting movement of the cutter, and gears for superposing upon the blank turning movement a blank feeding movement, said gears operating with the means for giving the blank holder the rotary oscillatory movement.

14. A gear cutting machine comprising a blank holder, means for giving said holder a rotary oscillating movement, means for moving the cutter across the face of the blank during said rotary oscillating movement, means for returning the cutter to the place of beginning, and gears for superposing upon the rotary oscillating movement of the blank holder a feed movement to position the blank for the next cutting operation, said gears forming part of and operating with the means for giving the blank holder a rotary oscillating movement.

19. A gear cutting machine comprising a blank holder means for giving said holder a rotary oscillating movement, means for moving the cutter across the face of the blank during said rotary oscillating movement, a differential gearing interposed in the blank holder oscillating means, and gears operating said differential gearing during the non-cutting movement of the cutter to advance the blank holder the distance of one tooth.

16. A gear cutting machine comprising a blank holder, means for giving said holder a rotary oscillating movement, means for moving the cutter across the face of the blank during said rotary oscillating movement, changeable gears for varying the extent of the oscillation of the blank holder, a differential gearing interposed in the blank holder oscillating means, and gears for operating said differential gearing during the non-cutting movement of the cutter to superpose a blank feeding movement upon the blank holder oscillating movement.

17. A gear cutting machine comprising a blank holder, a milling cutter, means for moving the cutter longitudinally of the blank, means for giving the blank holder a rotary oscillating motion during the cutting movement of the cutter, means for varying the extent of said oscillation to thereby vary the angle of the gear teeth, and gears for automatically feeding the blank to cut the desired number of teeth therein, said gears being changeable whereby the number of teeth cut in a blank may be varied.

18. A gear cutting machine comprising a blank holder, means for giving said holder a rotary oscillating movement, means for moving the cutter across the face of the blank during said rotary oscillating movement, changeable gears for varying the extent of the oscillation of the blank holder, and changeable gears for varying the extent of the feeding movement, said gears forming a part of and operating with the gears for oscillating the blank holder.

19. A gear cutting machine comprising a blank holder, means for giving said holder a rotary oscillating movement, means for moving the cutter across the face of the blank during said rotary oscillating movement, gear wheels controlling the extent of oscillation of the blank holder to give the desired angle to the teeth, gear wheels controlling the division of the blank into teeth, said gears also serving to oscillate the blank holder for the gear cutting operation, a differential gearing interposed between said sets of gears, and gears operating said differential gearing during the noncutting movement of the cutter to advance the blank holder the distance of one tooth, said differential gearing operating through the gear wheels controlling the division of the blank into teeth.

20. A gear cutting machine comprising a blank holder, a milling cutter, means for moving the cutter across the face of the blank, means for giving the blank holder a rotary motion during the cutting movement of the cutter to define the angle of the tooth to be cut, means for moving the blank holder a greater distance on its return movement, said means operating through the blank holder oscillating means during the return idle movement of the cutter.

21. A gear cutting machine comprising a blank holder, wheels for rotating the blank holder, means for driving said wheels to move the blank holder for a partial rotation and then reverse its movement, and means operating through said wheels to move the blank holder a greater distance upon its said reverse movement to advance the blank holder the distance of one tooth.

Signed at Mannheim this 30th day of December, 1912, in the presence of two witnesses.

JULIUS GRUNDSTEIN.

Witnesses:
 JOSEPH PFEIFFER,
 LUISE SCHILLER.